(12) United States Patent
Noishiki et al.

(10) Patent No.: US 8,999,088 B2
(45) Date of Patent: Apr. 7, 2015

(54) PROCESS FOR PRODUCTION OF FINELY FIBROUS CELLULOSE COMPOSITE PREPREG SHEET, PROCESS FOR PRODUCTION OF FINELY FIBROUS CELLULOSE COMPOSITE SHEET, AND PROCESS FOR PRODUCTION OF FINELY FIBROUS CELLULOSE COMPOSITE LAMINATE SHEET

(75) Inventors: Yasutomo Noishiki, Tokyo (JP); Mitsuru Tsunoda, Tokyo (JP); Takashi Kawamukai, Tokyo (JP)

(73) Assignee: Oji Holdings Corporation, Tokyo (JP)

( * ) Notice: Subject to any disclaimer, the term of this patent is extended or adjusted under 35 U.S.C. 154(b) by 52 days.

(21) Appl. No.: 13/992,034

(22) PCT Filed: Dec. 26, 2011

(86) PCT No.: PCT/JP2011/080016
§ 371 (c)(1),
(2), (4) Date: Jun. 6, 2013

(87) PCT Pub. No.: WO2012/090908
PCT Pub. Date: Jul. 5, 2012

(65) Prior Publication Data
US 2013/0264007 A1   Oct. 10, 2013

(30) Foreign Application Priority Data

Dec. 27, 2010   (JP) .................................. 2010-289167

(51) Int. Cl.
| | |
|---|---|
| C08J 5/24 | (2006.01) |
| D21H 17/33 | (2006.01) |
| D21H 21/14 | (2006.01) |
| B05D 3/10 | (2006.01) |
| D21H 11/18 | (2006.01) |
| D21H 25/06 | (2006.01) |
| D21H 27/30 | (2006.01) |
| D21H 17/37 | (2006.01) |
| D21H 15/02 | (2006.01) |

(52) U.S. Cl.
CPC ................ *B05D 3/108* (2013.01); *D21H 17/33* (2013.01); *D21H 21/14* (2013.01); *C08J 5/24* (2013.01); *D21H 11/18* (2013.01); *D21H 25/06* (2013.01); *D21H 27/30* (2013.01); *D21H 17/375* (2013.01); *D21H 15/02* (2013.01); *D21H 17/37* (2013.01)

(58) Field of Classification Search
CPC ........... C08J 5/24; D21H 17/33; D21H 17/34; D21H 17/37; D21H 17/375; D21H 17/46; D21H 17/47; D21H 17/48; D21H 17/52; D21H 17/57; D21H 21/00; D21H 21/14; D21H 25/04
USPC ...................... 156/62.2; 162/164.1
See application file for complete search history.

(56) References Cited

U.S. PATENT DOCUMENTS

| | | | | |
|---|---|---|---|---|
| 6,042,936 | A | * | 3/2000 | Kempf ........................... 428/323 |
| 6,103,790 | A | | 8/2000 | Cavaille et al. |
| 7,455,901 | B2 | * | 11/2008 | Yano et al. .................. 428/292.1 |
| 2009/0074228 | A1 | * | 3/2009 | Mango et al. ................. 381/432 |
| 2010/0272980 | A1 | * | 10/2010 | Kowata et al. ............... 428/220 |

FOREIGN PATENT DOCUMENTS

| | | |
|---|---|---|
| CN | 102575430 A | 7/2012 |
| GB | 2066145 A | 7/1981 |
| JP | A-56-100801 | 8/1981 |
| JP | A-02-160998 | 6/1990 |
| JP | A-05-148387 | 6/1993 |
| JP | A-08-188980 | 7/1996 |
| JP | A-08-188981 | 7/1996 |
| JP | A-09-216952 | 8/1997 |
| JP | A-09-509694 | 9/1997 |
| JP | A-10-248872 | 9/1998 |
| JP | A-11-209401 | 8/1999 |
| JP | B-3036354 | 4/2000 |
| JP | A-2000-191808 | 7/2000 |
| JP | A-2001-279016 | 10/2001 |
| JP | A-2001-522734 | 11/2001 |
| JP | A-2004-270064 | 9/2004 |
| JP | A-2005-060680 | 3/2005 |
| JP | B-3641690 | 4/2005 |
| JP | A-2006-193858 | 7/2006 |
| JP | A-2006-316253 | 11/2006 |
| JP | A-2007-023218 | 2/2007 |
| JP | A-2007-023219 | 2/2007 |

(Continued)

OTHER PUBLICATIONS

International Search Report issued in International Application No. PCT/JP2011/080016 on Apr. 3, 2012.
Office Action in Chinese Patent Application No. 201180062696.5, mailed Dec. 4, 2014.

*Primary Examiner* — Michael Tolin
(74) *Attorney, Agent, or Firm* — Knobbe Martens Olson & Bear LLP

(57) ABSTRACT

A method of producing a finely fibrous cellulose composite prepreg sheet, sheet or laminate sheet, the method including a mixing an emulsion of a reactive compound with an aqueous suspension containing a finely fibrous cellulose to prepare a mixed liquid dewatering the mixed liquid by filtration on a porous substrate to form a water-containing sheet; and heating and drying the water-containing sheet. A method of producing a finely fibrous cellulose composite sheet, the method including subjecting the finely fibrous cellulose composite prepreg sheet produced by the method described above to a curing treatment.

4 Claims, No Drawings

(56) References Cited

FOREIGN PATENT DOCUMENTS

| JP | A-2008-106152 | 5/2008 |
|---|---|---|
| JP | A-2008-127693 | 6/2008 |
| JP | A-2008-169497 | 7/2008 |
| JP | 2008-248441 | 10/2008 |
| JP | A-2009-167397 | 7/2009 |
| WO | WO 99/24651 | 5/1999 |
| WO | WO 2009/081881 A1 * | 7/2009 |
| WO | WO 2011/010609 A1 | 1/2011 |

* cited by examiner

PROCESS FOR PRODUCTION OF FINELY FIBROUS CELLULOSE COMPOSITE PREPREG SHEET, PROCESS FOR PRODUCTION OF FINELY FIBROUS CELLULOSE COMPOSITE SHEET, AND PROCESS FOR PRODUCTION OF FINELY FIBROUS CELLULOSE COMPOSITE LAMINATE SHEET

TECHNICAL FIELD

The present invention has an object of providing a method of producing a finely fibrous cellulose composite prepreg sheet with good efficiency, a method of producing a finely fibrous cellulose composite sheet, and a method of producing a finely fibrous cellulose composite laminate sheet.

The present application claims priority on Japanese Patent Application No. 2010-289167, filed Dec. 27, 2010, the content of which is incorporated herein by reference.

BACKGROUND ART

In recent years, nanotechnology, which by forming a substance at the nanometer size, has the object of obtaining different physical properties from the bulk substance or molecular level substance, is attracting much attention. On the other hand, because of enhanced awareness of alternatives to petroleum resources and environmental awareness, applications of reproducible natural fibers are also gathering much attention.

Among natural fibers, cellulose fibers, and especially cellulose fibers derived from timber (pulp) are widely used, mainly as paper products. The width of the cellulose fibers used in paper is mostly from 10 to 50 µm. The paper (sheet) obtained from these types of cellulose fibers is opaque, and being opaque, is widely used as paper for printing. On the other hand, if the cellulose fibers are treated (beaten or ground) using a refiner, a kneader, or a sand grinder or the like, thereby refining (microfibrillating) the cellulose fibers, then a transparent paper (such as a glassine paper) can be obtained. However, the transparency of these transparent papers is at the semi-transparent level, the optical transparency is low compared with polymer films, and the degree of cloudiness (haze value) is also large.

Further, cellulose fibers have a high elastic modulus and are aggregates of cellulose crystals having a low coefficient of thermal expansion, and by forming a composite of cellulose fibers with a polymer, the thermal dimensional stability is improved, enabling use in laminates and the like. However, typical cellulose fibers are crystal aggregates, and are fibers having cylindrical voids, and therefore there is a limit to the dimensional stability.

A water dispersion of finely fibrous cellulose having a fiber width of 50 nm or less, produced by mechanically grinding cellulose fibers, is transparent. On the other hand, a finely fibrous cellulose sheet contains voids, and therefore causes white irregular reflections that increase the opacity, but if a finely fibrous cellulose sheet is impregnated with a resin, then the voids are filled, meaning a transparent sheet can be obtained. Moreover, the fibers of a finely fibrous cellulose sheet are aggregates of cellulose crystals, and are extremely rigid and have a small fiber width, and therefore compared with a typical cellulose sheet (paper), the number of fibers within a sample of the same mass is dramatically higher. As a result, by forming a composite with a polymer, the fine fibers are dispersed more uniformly and densely within the polymer, and the thermal dimensional stability improves dramatically. Further, because the fibers are fine, the transparency is high. Finely fibrous cellulose composite sheets having these types of properties are attracting extremely high levels of expectation as flexible transparent substrates (transparent substrates that can be bent and folded) for organic EL and liquid crystal displays.

Numerous refining techniques and techniques for forming composites with polymers have been disclosed in relation to finely fibrous cellulose, but there have been almost no disclosures of techniques for forming finely fibrous cellulose into composite sheets while maintaining good industrial productivity.

Specifically, Patent Documents 1 to 3 disclose techniques for converting cellulose fibers to a finely fibrous form, but there is no disclosure nor mention relating to a technique for converting the finely fibrous cellulose to sheet form while simultaneously forming a composite with a polymer.

Patent Documents 4 to 10 disclose techniques and the like for improving the physical properties such as the mechanical strength by forming a composite of finely fibrous cellulose with a polymer, but there is almost no disclosure concerning techniques for simplifying the compositing process.

Furthermore, Patent Documents 10 to 20 disclose techniques for converting finely fibrous cellulose to a sheet form, but these techniques are unable to achieve an industrial level of productivity, and therefore the provision of a simple method of compositing finely fibrous cellulose with a polymer to form a composite sheet is desirable.

DOCUMENTS OF RELATED ART

Patent Documents

Patent Document 1: Japanese Unexamined Patent Application, First Publication No. Sho 56-100801
Patent Document 2: Japanese Unexamined Patent Application, First Publication No. 2008-169497
Patent Document 3: Japanese Patent (Granted) Publication No. 3,036,354
Patent Document 4: Japanese Patent (Granted) Publication No. 3,641,690
Patent Document 5: Published Japanese Translation No. Hei 9-509694 of PCT
Patent Document 6: Japanese Unexamined Patent Application, First Publication No. 2006-316253
Patent Document 7: Japanese Unexamined Patent Application, First Publication No. Hei 9-216952
Patent Document 8: Japanese Unexamined Patent Application, First Publication No. Hei 11-209401
Patent Document 9: Japanese Unexamined Patent Application, First Publication No. 2008-106152
Patent Document 10: Japanese Unexamined Patent Application, First Publication No. 2005-060680
Patent Document 11: Japanese Unexamined Patent Application, First Publication No. Hei 8-188981
Patent Document 12: Japanese Unexamined Patent Application, First Publication No. 2006-193858
Patent Document 13: Japanese Unexamined Patent Application, First Publication No. 2008-127693
Patent Document 14: Japanese Unexamined Patent Application, First Publication No. Hei 5-148387
Patent Document 15: Japanese Unexamined Patent Application, First Publication No. 2001-279016
Patent Document 16: Japanese Unexamined Patent Application, First Publication No. 2004-270064
Patent Document 17: Japanese Unexamined Patent Application, First Publication No. Hei 8-188980

Patent Document 18: Japanese Unexamined Patent Application, First Publication No. 2007-23218
Patent Document 19: Japanese Unexamined Patent Application, First Publication No. 2007-23219
Patent Document 20: Japanese Unexamined Patent Application, First Publication No. Hei 10-248872

SUMMARY OF THE INVENTION

Problems to be Solved by the Invention

The present invention provides a method of producing a finely fibrous cellulose composite prepreg sheet, the method including mixing an emulsion of a reactive compound with an aqueous suspension containing a finely fibrous cellulose, dewatering this mixed liquid by filtration on a porous substrate, and then performing drying. Further, the present invention also provides a method of producing a finely fibrous cellulose composite sheet by subjecting the aforementioned finely fibrous cellulose composite prepreg sheet to a curing treatment. Moreover, the present invention also provides a method of producing a finely fibrous cellulose composite laminate sheet by laminating two or more of the aforementioned finely fibrous cellulose composite prepreg sheets and then performing a curing treatment.

Means to Solve the Problems

The inventors of the present invention undertook various investigations to discover whether a finely fibrous cellulose material containing a large amount of water could be efficiently converted to a composite prepreg sheet by a method that included mixing an emulsion of a reactive compound with an aqueous suspension containing a finely fibrous cellulose, dewatering this mixed liquid by filtration on a porous substrate, and then performing drying, and based on their findings, they completed the present invention.

The present invention includes each of the following inventions.
(1) A method of producing a finely fibrous cellulose composite prepreg sheet, the method including a preparation step of mixing an emulsion of a reactive compound with an aqueous suspension containing a finely fibrous cellulose to prepare a mixed liquid, a papermaking step of dewatering the mixed liquid by filtration on a porous substrate to form a water-containing sheet, and a drying step of heating and drying the water-containing sheet.
(2) The method of producing a finely fibrous cellulose composite prepreg sheet according to (1), wherein the emulsion of a reactive compound is cationic.
(3) The method of producing a finely fibrous cellulose composite prepreg sheet according to (1) or (2), wherein the preparation step includes adding a cellulose coagulant to the mixed liquid containing the finely fibrous cellulose.
(4) The method of producing a finely fibrous cellulose composite prepreg sheet according to any one of (1) to (3), wherein in the preparation step, the fiber width of the mixed finely fibrous cellulose is from 2 to 1,000 nm.
(5) The method of producing a finely fibrous cellulose composite prepreg sheet according to any one of (1) to (4), wherein the reactive compound is a heat-curable compound, a photocurable compound, or an electron beam-curable compound.
(6) A method of producing a finely fibrous cellulose composite sheet, the method including subjecting the finely fibrous cellulose composite prepreg sheet produced by the method according to any one of (1) to (5) to a curing treatment.
(7) A method of producing a finely fibrous cellulose composite laminate sheet, the method including laminating two or more of the finely fibrous cellulose composite prepreg sheets produced by the method according to any one of (1) to (5), and then subjecting the laminated prepreg sheets to a curing treatment.

Effects of the Invention

The present invention is able to provide a method of producing a finely fibrous cellulose composite prepreg sheet that enables production to be performed extremely efficiently, a method of producing a finely fibrous cellulose composite sheet, and a method of producing a finely fibrous cellulose composite laminate sheet.

Modes for Carrying Out the Invention

The present invention is described below in detail.
The inventors of the present invention investigated preparing porous sheets of finely fibrous cellulose, and then impregnating the obtained porous sheets with a reactive compound and performing a curing treatment to prepare finely fibrous cellulose composite sheets. However, in this method, because it is necessary to first produce the porous sheet, and then impregnate the porous sheet with the reactive compound, an impregnation step is essential. Accordingly, it is clear that if the impregnation step could be eliminated, the productivity would improve significantly. Moreover, if the porosity of the finely fibrous cellulose is insufficient, then in some cases the reactive compound may not be able to be adequately impregnated, resulting in non-uniformity. As a result, a problem exists in that the types of reactive compounds that can be impregnated are limited.

As a result of intensive investigations, the inventors of the present invention discovered that by emulsifying the reactive compound in advance and then mixing the emulsion with the finely fibrous cellulose, a prepreg sheet or composite sheet of the reactive compound and the finely fibrous cellulose could be produced using only a papermaking step, and they were thus able to complete the present invention. According to the present invention, not only can the reactive compound impregnation step be eliminated, but a porosity enhancing step for the finely fibrous sheet using solvent substitution or the like can also be eliminated, and therefore there are large advantages from both cost and environmental perspectives, such as the elimination of steps and a reduction in solvent use.

The finely fibrous cellulose in the present invention is a cellulose fiber or a rod-shaped particle of cellulose having a far narrower width than a pulp fiber used in typical paper manufacturing applications. The finely fibrous cellulose is an aggregate of cellulose molecules in a crystalline state, and the crystal structure thereof is the I-type (parallel chain). In those cases where the minor axis of the finely fibrous cellulose of the present invention is deemed the width, the width of the cellulose is preferably from 2 nm to 1,000 nm, more preferably from 2 nm to 500 nm, and still more preferably from 4 nm to 100 nm, when viewed under an electron microscope. If the width of the fiber is less than 2 nm, then the cellulose dissolves in water as cellulose molecules, and therefore the cellulose is unable to exhibit the physical properties (strength, rigidity, or dimensional stability) of a fine fiber. If the width of the fiber exceeds 1,000 nm, then because the cellulose cannot be called a fine fiber, and is simply the type of fiber included in ordinary pulp, the physical properties (strength, rigidity, or dimensional stability) of a fine fiber cannot be obtained. Furthermore, in the case of an application that requires transparency in the finely fibrous cellulose composite, the width of the finely fibrous cellulose is preferably at least 2 nm but not more than 50 nm.

In those cases where the major axis of the finely fibrous cellulose is deemed the length, there are no particular limitations on the length provided it is at least 0.1 μm, but the length is preferably from 0.1 to 1,000 μm, more preferably from 0.2 to 500 μm, and still more preferably from 0.3 to 100 μm.

Here, the fact that the finely fibrous cellulose adopts the I-type crystal structure can be identified from the fact that the finely fibrous cellulose has typical peaks at two locations in the vicinity of $2\theta=14°$ to $17°$ and $2\theta=22°$ to $23°$ in a diffraction profile obtained from a wide-angle X-ray diffraction photograph using $CuK\alpha(\lambda=1.5418 Å)$ that has been monochromatized by graphite. Further, measurement of the fiber width of the finely fibrous cellulose using an electron microscope observation is performed in the following manner. An aqueous suspension of the finely fibrous cellulose having a concentration of 0.05 to 0.1% by mass is prepared, and the suspension is cast on a grid coated with a hydrophilically treated carbon film to prepare a TEM observation sample. In those cases where the finely fibrous cellulose includes fibers having a broad width, an SEM image of the surface cast on a glass plate may be observed. Observation is conducted using electron microscope images acquired at a magnification of 5000 times, 10,000 times or 50,000 times depending on the width of the constituent fibers. At this time, the sample and the observation conditions (such as the magnification) are set so that at least 20 fibers intersect the axes when vertical and horizontal axes having an arbitrary image width are envisaged in the obtained image. Two vertical axes and two horizontal axes are drawn arbitrarily on a single observation image so as to satisfy these conditions, and the fiber widths of fibers that cross the axes are read visually. A minimum of three images of non-overlapping portions of the surface are observed using an electron microscope in this manner, and the values of the fiber widths of fibers that cross two axes in the respective images are measured (a minimum of 20 fibers×2× 3=fiber widths of 120 fibers).

There are no particular limitations on the method of producing the finely fibrous cellulose, but a method in which cellulose-based fibers are refined by wet grinding using a mechanical action such as that provided by a grinder (stone mill grinder), a high-pressure homogenizer or ultra high-pressure homogenizer, a high-pressure impact grinder, a disc-type refiner, or a conical refiner is preferred. Further, cellulose-based fibers may also be refined by performing a chemical treatment such as TEMPO oxidation, an ozone treatment, or an enzyme treatment. Examples of the cellulose-based fiber subjecting to refining include plant-derived cellulose, animal-derived cellulose, and bacteria-derived cellulose. More specific examples of the cellulose-based fiber subjecting to refining include timber-based paper-manufacturing pulp such as softwood pulp or hardwood pulp, cotton-based pulp such as cotton linter or cotton lint, non-timber-based pulp such as linen, wheat straw or bagasse, and cellulose isolated from sea squirts or marine plants or the like. Among these, timber-based paper-manufacturing pulp or non-timber-based pulp is preferable in terms of ease of availability.

The aqueous suspension containing a finely fibrous cellulose of the present invention is a liquid obtained by suspending the aforementioned finely fibrous cellulose in water, and is obtained by the wet grinding described above. In terms of the proportion used when suspending the finely fibrous cellulose in water, the ratio of water:finely fibrous cellulose is preferably from 100:0.01 to 100:30, more preferably from 100:0.05 to 100:10, and still more preferably from 100:0.1 to 100:5. The solution used for suspending the finely fibrous cellulose is preferably water, but the water may include from 1 to 30% of an alcohol such as methanol, ethanol or isopropyl alcohol, or a solvent such as ethylene glycol or diethylene glycol.

In the present invention, an emulsion of a reactive compound is mixed with the aqueous suspension obtained by suspending the finely fibrous cellulose in water.

Here, the emulsion of a reactive compound refers to an emulsion obtained by emulsifying a natural or synthetic reactive compound using an emulsifier, and is a milky white liquid in which fine particles having a particle diameter of approximately 0.001 to 10 μm are dispersed in water.

The method of producing the emulsion of the reactive compound is described below. First, examples of the reactive compound used in the present invention include polymerizable compounds that form chemical bonds under external stimulus such as heat, light or an electron beam.

The polymerizable compound mentioned above is a compound that polymerizes under external stimulus such as heat, light or an electron beam, and examples include compounds having a double bond or triple bond.

Examples of the external stimulus such as heat, light or an electron beam, in the case of heat, include stimulus provided by heating, for example, at 50 to 200° C. for a period of 1 second to 300 minutes. In the case of light, examples of the stimulus include irradiation with ultraviolet light having a wavelength of 200 to 400 nm for a period of 1 second to 300 minutes. Specific examples of stimulus provided by ultraviolet light having a wavelength of 200 to 400 nm include stimulus provided by a high-pressure mercury lamp or a metal halide lamp or the like.

In the emulsion of the reactive compound, the emulsifier is included in an amount within a range from 0.1 to 10% by mass relative to the reactive compound. If the amount of the emulsifier is less than 0.1% by mass, then the emulsion stability becomes unsatisfactory, and there is a possibility that aggregates may be generated during the reaction. Further, if the amount of the emulsifier exceeds 10% by mass, then the amount becomes excessive, and not only is the efficiency poor, but foaming becomes more likely, which are undesirable.

There are no particular limitations on the emulsifier used in the present invention, provided it is an amphiphilic compound having a hydrophilic group and a hydrophobic group, but a carboxylic acid having an alkyl group or an aromatic ring, an ester of such a carboxylic acid with an alcohol having an alkyl group of 1 to 20 carbon atoms, or a polyoxyethylene compound having an HLB value within a range from 3 to 17 is preferable.

Examples of the emulsifier used in the present invention include anionic emulsifiers such as potassium oleate, sodium laurate, sodium dodecylbenzenesulfonate, sodium alkyl naphthalene sulfonates, sodium dialkyl sulfosuccinates, sodium polyoxyethylene alkyl ether sulfates, sodium polyoxyethylene alkylaryl ether sulfates, sodium polyoxyethylene dialkyl sulfates, polyoxyethylene alkyl ether phosphate esters or polyoxyethylene alkylaryl ether phosphate esters, or nonionic emulsifiers such as polyoxyethylene alkyl ethers, polyoxyethylene alkylaryl ethers, poly(oxyethylene-oxypropylene) block copolymers, polyethylene glycol aliphatic acid esters and polyoxyethylene sorbitan aliphatic acid esters. Additional examples include cationic emulsifiers, including quaternary ammonium salts such as alkyl trimethyl ammonium salts, dialkyl dimethyl ammonium salts, alkyl dimethyl benzyl ammonium salts, acyl aminoethyl diethyl ammonium salt, acyl aminoethyl diethylamine salts, alkyl amidopropyl dimethyl benzyl ammonium salts, alkyl pyridinium salts, alkyl pyridinium sulfates, stearamidomethylpyridinium salts, alkyl quinolinium salts, alkyl isoquinolinium salts, aliphatic acid polyethylene polyamides, acyl aminoethyl pyridinium salts or acyl colaminoformyl methylpyridinium salts, ester-bonded amines and ester-bonded quaternary ammonium salts such as stearoxy methylpyridinium salts, aliphatic acid triethanolamines, aliphatic acid triethanolamine formates, trioxyethylene aliphatic acid triethanolamines, cetyloxy methylpyridinium salts or p-isooctylphenoxy ethoxyethyl dimethyl benzyl ammonium salts, heterocyclic amines such as alkyl imidazolines, 1-hydroxyethyl-2-alkylimidazolines, 1-acetylaminoethyl-2-alkylimidazolines or 2-alkyl-4-methyl-4-hydroxymethyloxazolines, and amine derivatives such as polyoxyethylene alkyl amines, N-alkyl propylene diamines, N-alkyl polyethylene polyamines, N-alkyl polyethylene polyamine dimethyl sulfates, alkyl biguanides or long chain amine oxides. Moreover, polymer compounds having an emulsification dispersion capability and a comparatively low molecular weight, such as polyvinyl alcohols, modified products thereof, polyacrylamides, polyethylene glycol derivatives, neutralized products of polycarboxylic acid copolymers or casein, may be used individually or in combination with the aforementioned emulsifier.

The alkyl groups mentioned above refer to alkyl groups of 1 to 20 carbon atoms.

The acyl groups mentioned above refer to alkanoyl groups of 1 to 20 carbon atoms.

The esters mentioned above refer to esters of an alcohol having an alkyl group of 1 to 20 carbon atoms and either an aliphatic acid or phosphoric acid.

The aliphatic acids mentioned above refer to alkylcarboxylic acids of 1 to 20 carbon atoms.

The long chain amines mentioned above refer to alkylamines of 1 to 20 carbon atoms.

The aforementioned polymer compounds having a comparatively low molecular weight refer to hydrophilic polymers having a molecular weight of 1,000 to 100,000.

The modified products mentioned above refer to viscous polyvinyl alcohols obtained by modifying the hydroxyl groups of a polyvinyl alcohol with a carboxylic acid or sulfonic acid or the like.

The emulsifier used in the present invention is preferably an amphiphilic compound having an HLB value within a range from 3 to 17.

Examples of the reactive compound used in the present invention include ethylenic unsaturated carboxylic acid-containing monomers such as meth(acrylic) acid, crotonic acid, maleic acid, itaconic acid, fumaric acid, monoalkyl maleic acids or monoalkyl fumaric acids, as well as the acid anhydrides of these acids. The above term monoalkyl refers to an alkyl chain of 1 to 30 carbon atoms.

Specific examples of the reactive compound used in the present invention include methyl(meth)acrylate, ethyl(meth) acrylate, propyl(meth)acrylate, butyl(meth)acrylate, hexyl (meth)acrylate, octyl(meth)acrylate, 2-ethylhexyl(meth) acrylate, lauryl(meth)acrylate, stearyl(meth)acrylate, vinyl acetate, vinyl chloride, vinylidene chloride, (meth)acrylonitrile, styrene, ethylene, propylene, butadiene, isoprene, chloroprene, 2-hydroxyethyl(meth)acrylate, 2-hydroxypropyl (meth)acrylate, 2-hydroxybutyl(meth)acrylate, polyethylene glycol(meth)acrylate, 2-hydroxy-3-phenoxypropyl(meth) acrylate, glycerol mono(meth)acrylate, ethylene glycol di(meth)acrylate, diethylene glycol di(meth)acrylate, triethylene glycol di(meth)acrylate, polyethylene glycol di(meth) acrylate, dipropylene glycol di(meth)acrylate, 1,3-butylene glycol di(meth)acrylate, trimethylolpropane tri(meth)acrylate, tetramethylolmethane tetra(meth)acrylate, divinylbenzene, 1,4-butanediol di(meth)acrylate, 1,6-hexanediol di(meth)acrylate, glycidyl(meth)acrylate, methylglycidyl (meth)acrylate, N-methylol(meth)acrylamide, N-methoxymethyl(meth)acrylamide, N-butoxymethyl(meth)acrylamide, N,N-methylene bis(meth)acrylamide, 2,2-bis[4-(acryloxypolyethoxy)phenyl]propane (EO 10 mol adduct), 2,2-bis[4-(acryloxypolyethoxy)phenyl]propane (EO 17 mol adduct), 2,2-bis[4-(acryloxypolyethoxy)phenyl]propane (EO 30 mol adduct), 2,2-bis[4-(acryloxydiethoxy)phenyl] propane (EO 4 mol adduct), 9,9-bis[4-(2-acryloyloxyethoxy) phenyl]fluorene, 2,2-bis[4-(acryloxypolypropoxy)phenyl] propane (PO 3 mol adduct), tricyclodecanedimethanol diacrylate, 1,10-decanediol diacrylate, 1,6-hexanediol diacrylate, 1,9-nonanediol diacrylate, dipropylene glycol diacrylate, tripropylene glycol diacrylate, polypropylene glycol #400 diacrylate, epoxidized o-phenylphenol acrylate, propylene glycol diacrylate, methoxy polyethylene glycol #400 acrylate, methoxy polyethylene glycol #550 acrylate, phenoxy polyethylene glycol acrylate, 2-acryloyloxyethyl succinate, isostearyl acrylate, 2-hydroxy-3-acryloxypropyl methacrylate, polyethylene glycol #200 diacrylate, polyethylene glycol #400 diacrylate, polyethylene glycol #600 diacrylate, polyethylene glycol #1000 diacrylate, propoxylated ethoxylated bisphenol A diacrylate (PO 12 mol/EO 6 mol adduct), 2,2-bis[4-(acryloxypolyethoxy)phenyl]propane (EO 3 mol adduct), polyethylene glycol #400 dimethacrylate, polyethylene glycol #600 dimethacrylate, polyethylene glycol #1000 dimethacrylate, 2,2-bis[4-(methacryloxyethoxy)phenyl]propane (EO 2.3 mol adduct), 2,2-bis[4-(methacryloxyethoxy) phenyl]propane (EO 2.6 mol adduct), 2,2-bis[4-(methacryloxydiethoxy)phenyl]propane (EO 4 mol adduct), 2,2-bis[4-(methacryloxypolyethoxy)phenyl]propane (EO 10 mol adduct), 2,2-bis[4-(methacryloxypolyethoxy)phenyl]propane (EO 17 mol adduct), 2,2-bis[4-(methacryloxypolyethoxy)phenyl]propane (EO 30 mol adduct), tricyclodecanedimethanol dimethacrylate, 1,10-decanediol dimethacrylate, 1,6-hexanediol dimethacrylate, 1,9-nonanediol dimethacrylate, dipentaerythritol polyacrylate, dipentaerythritol hexaacrylate, 2-methacryloyloxyethyl phthalate, methoxy polyethylene glycol #400 methacrylate (EO 9 mol adduct), methoxy polyethylene glycol #1000 methacrylate (EO 23 mol adduct), phenoxy ethylene glycol methacrylate (EO 1 mol adduct), stearyl methacrylate, 2-methacryloyloxyethyl succinate, isostearyl methacrylate, ethylene glycol dimethacrylate, diethylene glycol dimethacrylate, triethylene glycol dimethacrylate, polyethylene glycol #200 dimethacrylate, neopentyl glycol dimethacrylate, ethoxylated polypropylene glycol #700 dimethacrylate (PO 12 mol/EO 6 mol adduct), glycerol dimethacrylate, polypropylene glycol #400 dimethacrylate, trimethylolpropane trimethacrylate, polypropylene glycol #700 diacrylate, polytetramethylene glycol #650 diacrylate, tris(2-acryloxyethyl)isocyanurate, ε-caprolactone-modified tris(2-acryloxyethyl)isocyanurate, ethoxylated glycerol triacrylate (EO 9 mol adduct), ethoxylated glycerol triacrylate (EO 20 mol adduct), pentaerythritol triacrylate (triester 37%), pentaerythritol triacrylate (triester 55%), pentaerythritol triacrylate (triester 57%), trimethylolpropane triacrylate, ditrimethylolpropane tetraacrylate, ethoxylated pentaerythritol tetraacrylate or pentaerythritol tetraacrylate, and at least one compound selected from the group consisting of these compounds, or a copolymerized oligomer of these compounds can be used.

The reactive compound used in the present invention is preferably a heat-curable compound, a photocurable compound, or an electron beam-curable compound.

The heat-curable compound is a compound that cures when exposed to heat of 50 to 200° C. for a period of 1 second to 300 minutes, and examples include thermal decomposition initiators.

The photocurable compound is a compound that cures when irradiated with light having a wavelength of 200 to 400 nm for a period of 1 second to 300 minutes, and examples include photodecomposition initiators.

The electron beam-curable compound is a compound that cures when irradiated with an electron beam for a period of 1 second to 300 minutes, and examples include the reactive compounds mentioned above.

In the present invention, in order to regulate the polymerization degree (average molecular weight) of the aforementioned curable compound, a chain transfer agent may be used with the curable compound in the curing treatment for the finely fibrous cellulose composite prepreg sheet.

Examples of chain transfer agents that can be used include mercaptans such as n-dodecyl mercaptan, octyl mercaptan, t-butyl mercaptan, thioglycolic acid, thiomalic acid or thiosalicylic acid, sulfides such as diisopropyl xanthogen disulfide, diethyl xanthogen disulfide or diethyl thiuram disulfide, halogenated hydrocarbons such as iodoform, as well as diphenylethylene, p-chlorodiphenylethylene, p-cyanodiphenylethylene, α-methylstyrene dimer or sulfur.

In the present invention, a polymerization inhibitor may be added in advance to the curable compound to stabilize the curable compound.

Examples of polymerization inhibitors that can be used include phenothiazine, 2,6-di-t-butyl-4-methylphenol, 2,2'-methylene bis(4-ethyl-6-t-butylphenol), tris(nonylphenyl) phosphite, 4,4'-thiobis(3-methyl-6-t-butylphenol), N-phenyl-1-naphthylamine, 2,2'-methylenebis(4-methyl-6-t-butylphenol), 2-mercaptobenzimidazole, hydroquinone or N,N-diethylhydroxylamine.

Next is a description of a method for emulsifying the reactive compound. The emulsification is performed using a typical apparatus in which oil or the like is dispersed in water and emulsified. Examples of the apparatus include a high-speed rotary emulsifying apparatus such as a homo mixer or saw tooth homogenizer, a high-pressure emulsifying apparatus such as a high-pressure homogenizer or microfluidizer, a roll mill, an ultrasound apparatus, or a porous film. There are no particular limitations on the order of addition or the addition method used when performing the emulsification, but examples include a method in which the emulsifier is added to the reactive compound, and water is then added gradually with stirring, a method in which the reactive compound is added gradually with stirring to water containing the emulsifier, and a method in which the emulsifier and the reactive compound are added and stirred simultaneously.

In the present invention, considering yield and the dewatering properties, the particle diameter of the reactive compound emulsion is preferably large, but if the particle diameter is too large, then there is a possibility that the uniformity or the optical properties of the sheet may deteriorate, and therefore the particle diameter is preferably from 0.001 to 10 μm, which is a size that is appropriate for the intended purpose. Considering the fact that the aqueous suspension of the finely fibrous cellulose and the emulsion of the reactive compound are mixed together, it is advantageous in terms of dispersion stability and yield and the like that the emulsion of the reactive compound has a cationic surface charge.

The amount of the reactive compound relative to the water is preferably from 5 to 70% by mass, more preferably from 10 to 60% by mass, and particularly preferably from 20 to 50% by mass. If the amount of the reactive compound is less than 5% by mass, then the slurry concentration during papermaking decreases, and the efficiency is poor. If the amount of the reactive compound exceeds 70% by mass, then the dispersibility of the emulsion becomes unstable, which is undesirable.

The mixed liquid containing the finely fibrous cellulose used in the present invention is prepared by adding the emulsion of the reactive compound to the aqueous suspension of the finely fibrous cellulose while stirring the suspension. There are no particular limitations on the stirring device, provided it is capable of uniformly mixing and stirring the cellulose and the reactive compound emulsion, and examples of devices that can be used include an agitator, a homo mixer and a pipeline mixer.

In the present invention, in the aforementioned preparation step, a cellulose coagulant is preferably added to the mixed liquid. Examples of the cellulose coagulant include water-soluble inorganic salts and water-soluble organic compounds containing a cationic functional group. Examples of the water-soluble inorganic salt include sodium chloride, calcium chloride, potassium chloride, ammonium chloride, magnesium chloride, aluminum chloride, sodium sulfate, potassium sulfate, aluminum sulfate, magnesium sulfate, sodium nitrate, calcium nitrate, sodium carbonate, potassium carbonate, ammonium carbonate, sodium phosphate or ammonium phosphate.

From the viewpoint of decomposing and volatilizing under the heat used during drying, the water-soluble inorganic salt is preferably ammonium carbonate.

Examples of the water-soluble organic compound containing a cationic functional group include polyacrylamide, polyvinylamine, urea resin, melamine resin, melamine-formaldehyde resin, or polymers obtained by polymerizing or copolymerizing a monomer containing a quaternary ammonium salt.

From the viewpoint of ensuring easy control of the coagulating power of the aforementioned coagulant, the water-soluble organic compound containing a cationic functional group is preferably a polymer containing a quaternary ammonium salt.

The amount added of the cellulose coagulant must be at least sufficient to cause gelling of the aqueous suspension. Specifically, the cellulose coagulant is preferably added in an amount of 0.5 to 10 parts by mass relative to 100 parts by mass of the finely fibrous cellulose. If the amount added of the cellulose coagulant is less than 0.5 parts by mass, then there is a possibility that the gelling of the aqueous suspension may be insufficient, and the effect of the coagulant in improving the water filtration properties may deteriorate. If the amount added exceeds 10 parts by mass, then there is a possibility that the gelling may proceed excessively, making handling of the aqueous suspension difficult. The amount added of the coagulant is more preferably from 1 to 8 parts by mass.

Here, the gelling caused by the present invention refers to a change in state wherein the viscosity of the aqueous suspension increases rapidly and significantly, and the fluidity is lost. However, the gel obtained at this point has a jelly-like form, and is easily broken by stirring. A determination as to whether gelling has occurred can be made visually since the suspension adopts a state in which the fluidity is abruptly lost, but in the case of the finely fibrous cellulose aqueous suspension containing the cellulose coagulant according to the present invention, the determination is made based on the B-type viscosity at a concentration of 0.5% by mass and a temperature of 25° C. (measurement conditions: rotor No. 4, rotational speed 60 rpm). The viscosity is preferably at least 100 mPa·s or more, more preferably 200 mPa·s or greater, and particularly preferably 300 mPa·s or greater. If the B-type viscosity is less than 100 mPa·s, then there is a possibility that the gelling of the aqueous suspension may be insufficient, and the effect in improving the water filtration properties may deteriorate.

The range for the aforementioned viscosity is preferably from 100 to 10,000 mPa·s, more preferably from 200 to 4,000 mPa·s, and still more preferably from 300 to 2,000 mPa·s.

In the present invention, an example of the method of producing the finely fibrous cellulose composite prepreg sheet by converting the aqueous suspension containing the finely fibrous cellulose and the reactive compound emulsion to a sheet form is a method that uses a production apparatus disclosed in Japanese Patent Application No. 2009-173136, including a water squeezing section which discharges a dispersion containing fine fibers onto the upper surface of an endless belt, and squeezes the dispersion medium from the discharged dispersion to generate a web, and a drying section which dries the web to generate a fiber sheet, wherein the endless belt spans from the water squeezing section through to the drying section, and the web generated in the water squeezing section is transported into the drying section mounted on the endless belt.

In the papermaking step of the production method of the present invention, the mixed liquid of the aqueous suspension containing the finely fibrous cellulose and the emulsion of the reactive compound is dewatered by filtration on a porous substrate to form a water-containing sheet.

Examples of dewatering methods that can be used in the present invention include the dewatering methods typically used in the production of paper, and a method in which the mixed liquid is dewatered by filtration on a porous substrate such as a Fourdrinier, a cylinder mold, or an inclined wire mesh or the like, and then further dewatered using a roll press is preferred. Further, methods typically used in the production of paper can be used as the drying method, and for example, methods using a cylinder dryer, a Yankee dryer, hot air drying, or an infrared heater or the like are preferable.

Examples of porous substrates that can be used for the wire mesh during dewatering include the wires typically used for ordinary papermaking. For example, metal wires made of stainless steel or bronze or the like, and plastic wires made of polyester, polyamide, polypropylene or polyvinylidene fluoride or the like are preferable. Furthermore, a membrane filter of a cellulose acetate substrate or the like may also be used as the wire mesh. The mesh aperture of the wire is preferably from 0.2 μm to 200 μm, and more preferably from 0.4 μm to 100 μm. If the mesh aperture is less than 0.2 μm, then the dewatering rate slows dramatically, which is undesirable. If the mesh aperture exceeds 200 μm, then the yield of finely fibrous cellulose decreases, which is also undesirable.

The concentration of the mixed liquid in the aforementioned preparation step is preferably not more than 3% by mass, more preferably from 0.1 to 1% by mass, and particularly preferably from 0.2 to 0.8% by mass. If the concentration of the mixed liquid exceeds 3% by mass, then there is a possibility that the viscosity will be too high, making handling difficult. The viscosity of the mixed liquid, reported as a B-type viscosity, is preferably from approximately 100 to 5,000 mPa·s.

An example of the method of producing the aforementioned finely fibrous cellulose composite sheet is a method in which the aforementioned finely fibrous cellulose composite prepreg sheet is subjected to a curing treatment. Examples of the curing treatment include a method of heat curing the finely fibrous cellulose composite prepreg sheet, a method of curing the sheet by ultraviolet irradiation, or a method of curing the sheet by electron beam irradiation.

Further, an example of the method of producing the aforementioned finely fibrous cellulose composite laminate sheet is a method in which two or more of the finely fibrous cellulose composite prepreg sheets are laminated, and the laminated prepreg sheets are then subjected to a curing treatment. Examples of the curing treatment include a method of heat curing the two or more laminated prepreg sheets, a method of curing the laminated sheets by ultraviolet irradiation, and a method of curing the laminated sheets by electron beam irradiation.

Curing by heat is a method in which a hot press at 100 to 180° C. is used to perform pressing for 10 to 60 minutes at atmospheric pressure, or under vacuum, or in an inert gas atmosphere.

The method of curing by ultraviolet irradiation is a method in which curing is performed by irradiating ultraviolet light having a wavelength of 100 to 400 nm onto the prepreg. In the case of ultraviolet irradiation, the curing rate is faster if the prepreg sheet contains a photopolymerization initiator, which is preferable.

The method of curing by electron beam irradiation offers the advantage that, because the electron beam energy is large, curing is extremely rapid. The dose of the irradiated electron beam is typically within a range from 10 to 200 kGy, and preferably from approximately 20 to 100 kGy. By ensuring the dose is at least 10 kGy, the resin component can be cured satisfactorily, whereas by ensuring that the dose is not more than 200 kGy, there is no concern that excessive electron beam irradiation may cause discoloration of the composite sheet or a reduction in the strength. Further, including a photopolymerization initiator in the prepreg sheet increases the curing rate even more, and is therefore preferable.

The basis weight of the finely fibrous cellulose composite sheet obtained in the present invention is preferably from 0.1 to 1,000 g/m$^2$, more preferably from 1 to 500 g/m$^2$, and particularly preferably from 5 to 100 g/m$^2$. If the basis weight is less than 0.1 g/m$^2$, the strength of the sheet becomes extremely weak, and continuous production becomes difficult. If the basis weight exceeds 1,000 g/m$^2$, then the dewatering takes an extremely long time, and the productivity deteriorates markedly, which is undesirable.

The thickness of the finely fibrous cellulose composite sheet obtained in the present invention is preferably from 0.1 to 1,000 μm, more preferably from 1 to 500 μm, and particularly preferably from 5 to 100 μm. If the thickness is less than 0.1 μm, then the strength of the sheet becomes extremely weak, and continuous production becomes difficult. If the thickness exceeds 1,000 μm, then the dewatering takes an extremely long time, and the productivity deteriorates markedly, which is undesirable.

The finely fibrous cellulose composite sheet obtained in the present invention may be treated by size pressing or coating or the like in a post process in order to obtain the target properties.

The composite sheet prepared using the present invention is a wrinkle-free high-density sheet having a high elastic modulus derived from cellulose. Further, it is also possible to impart the functions of a polymer, including improved water resistance or improved wet dimensional stability resistance, to the cellulose sheet, which is inherently weak in water or suffers significant dimensional change under humidity.

EXAMPLES

Hereinafter, examples are presented to describe the present invention in further detail, but the present invention is in no way limited by these examples. Further, the parts and % in the examples refer to parts by mass and % by mass unless specified otherwise.

(Production of Finely Fibrous Cellulose Aqueous Suspension A)

Douglas fir chips typically used in pulp production were classified using a chip thickness classifier, and the moisture content (mass of water/total mass of chips including water) of the chips from the 8 mm-pass 2 mm-on fraction was adjusted to approximately 7% under natural sunlight to obtain a wood crushing sample.

The chips were crushed coarsely using a coarse crushing machine (Hammer Crusher HC-400) manufactured by Makino Mfg. Co., Ltd. Without performing any classification, the resulting crushed chips were subjected to primary fine crushing using a DD Mill manufactured by Makino Mfg. Co., Ltd. (screen: 0.8 mmϕ, DD-3 model), and then to secondary fine crushing using a DD Mill (screen: 0.2 mmϕ, DD-3 model).

The resulting wood powder was treated at 90° C. for 5 hours while undergoing stirring in a 2% aqueous solution of sodium carbonate, thus effecting a delipidation treatment. Following treatment, the raw material was washed with distilled water equal to 10 times the weight of the material, and following dewatering using a Buchner funnel, distilled water was added to adjust the concentration.

Acetic anhydride and a 30% hydrogen peroxide solution were mixed in a liquid volume ratio of 1:1, 1.5 L of the resulting liquid was added to the delipidation treated raw material (BD30 g) to provide the equivalent of 4.5% of hydrogen peroxide relative to the raw material, and treatment was performed at 90° C. for one hour to effect delignification. The slurry-like delignification treated raw material (BD30 g) was subjected to a 24-hour immersion treatment at room temperature using a 5% aqueous solution of potassium hydroxide. The material was then washed with distilled water equal to 10 times the weight of the material, and following dewatering using a Buchner funnel, distilled water was added to prepare a 2% pulp suspension.

The aforementioned pulp slurry was treated at a rotational speed of 7,000 rpm for 2 hours using a Clearmix 9S (manufactured by M Technique Co., Ltd.) to obtain a finely fibrous cellulose aqueous suspension A.

(Production of Finely Fibrous Cellulose Aqueous Suspension B)

The aforementioned finely fibrous cellulose aqueous suspension A was diluted with water to a concentration of 0.30%, and with the suspension undergoing stirring with a magnetic stirrer, ultrasonic irradiation was performed for 30 minutes using an ultrasound irradiation apparatus UP-400S (Hielscher Ultrasonics GmbH). This ultrasound treated dispersion was subjected to a centrifugal separation at 5,400 rpm (12,000 G) for 10 minutes to obtain a finely fibrous cellulose aqueous suspension B.

(Production of Reactive Compound Emulsion A)

One hundred grams of a liquid obtained by mixing 10 parts of a reactive compound (NK Ester A-DOD-N, manufactured by Shin-Nakamura Chemical Co., Ltd.) [1,10-decanediol diacrylate], 0.1 parts of a thermal polymerization initiator (Percumyl D, manufactured by NOF Corporation) [dicumyl peroxide] and 0.2 parts of nonylphenol EO 16 mol adduct as a surfactant in 89.7 parts of water was irradiated with ultrasound at 30 kHz for one minute using an ultrasound irradiation apparatus UP100H (Hielscher Ultrasonics GmbH) while undergoing stirring with a magnetic stirrer.

(Production of Reactive Compound Emulsion B)

One hundred grams of a liquid obtained by mixing 10 parts of the reactive compound (NK Ester A-DOD-N, manufactured by Shin-Nakamura Chemical Co., Ltd.), 0.01 parts of a photopolymerization initiator (Lucirin TPO, manufactured by BASF Japan, Ltd.) [2,4,6-trimethylbenzoyl diphenylphosphine oxide] and 0.2 parts of nonylphenol EO 16 mol adduct as a surfactant in 89.79 parts of water was irradiated with ultrasound at 30 kHz for one minute using an ultrasound irradiation apparatus UP100H (Hielscher Ultrasonics GmbH) while undergoing stirring with a magnetic stirrer.

Example 1

Preparation of Prepreg Sheet

Following mixing of 780 parts of the aforementioned finely fibrous cellulose aqueous suspension A diluted to a concentration of 0.2% and 15.6 parts of the aforementioned reactive compound emulsion A, 15.6 parts of a cationic coagulant having a concentration of 0.2% (product name: Fixer Ju 621, manufactured by Kurita Kogyo Kagaku Co., Ltd.) was added, and the mixture was stirred for one minute. The thus obtained mixed liquid was subjected to suction dewatering on a nonwoven fabric (product name: TechnoWiper, manufactured by Technos Co., Ltd.) that had undergone a hot calendering treatment at 180° C., thus obtaining a wet sheet.

The obtained wet sheet was dried for 40 minutes under pressure in a 70° C. cylinder dryer to obtain a prepreg sheet. The obtained prepreg sheet was peeled from the TechnoWiper, yielding a finely fibrous cellulose composite prepreg sheet having a basis weight of 45.2 g/m$^2$.

(Heat-Cured Composite Sheet)

The aforementioned prepreg sheet was pressed for 30 minutes under vacuum in a 140° C. hot press, and was then dried for 40 minutes under pressure in a cylinder dryer, thus achieving heat curing. The obtained composite sheet was semi-transparent.

(Laminated and Heat-Cured Composite Sheet 1)

Two of the aforementioned prepreg sheets were overlapped, and following pressing for 30 minutes under vacuum in a 140° C. hot press, drying was performed for 40 minutes under pressure in a cylinder dryer, thus achieving heat curing. The obtained composite sheet was semi-transparent.

(Laminated and Heat-Cured Composite Sheet 2)

Five of the aforementioned prepreg sheets were overlapped, and following pressing for 30 minutes under vacuum in a 140° C. hot press, drying was performed for 40 minutes under pressure in a cylinder dryer, thus achieving heat curing. The obtained composite sheet was semi-transparent.

(Laminated and Heat-Cured Composite Sheet 3)

Ten of the aforementioned prepreg sheets were overlapped, and following pressing for 30 minutes under vacuum in a 140° C. hot press, drying was performed for 40 minutes under pressure in a cylinder dryer, thus achieving heat curing. The obtained composite sheet was semi-transparent.

Example 2

Preparation of Prepreg Sheet

Following mixing of 780 parts of the aforementioned finely fibrous cellulose aqueous suspension B diluted to a concentration of 0.2% and 15.6 parts of the aforementioned reactive compound emulsion A, 15.6 parts of a cationic coagulant having a concentration of 0.2% (product name: Fixage 621, manufactured by Kurita Kogyo Kagaku Co., Ltd.) was added, and the mixture was stirred for one minute. The thus obtained mixed liquid was subjected to suction dewatering on a nonwoven fabric (product name: TechnoWiper, manufactured by Technos Co., Ltd.) that had undergone a hot calendering treatment at 180° C., thus obtaining a wet sheet.

The obtained wet sheet was dried for 40 minutes under pressure in a 70° C. cylinder dryer to obtain a prepreg sheet. The obtained prepreg sheet was peeled from the TechnoWiper, yielding a finely fibrous cellulose composite prepreg sheet having a basis weight of 45.2 $g/m^2$.
(Heat-Cured Composite Sheet)

The aforementioned prepreg sheet was pressed for 30 minutes under vacuum in a 140° C. hot press, and was then dried for 40 minutes under pressure in a cylinder dryer, thus achieving heat curing. The obtained composite sheet was transparent.
(Laminated and Heat-Cured Composite Sheet)

Five of the aforementioned prepreg sheets were overlapped, and following pressing for 30 minutes under vacuum in a 140° C. hot press, drying was performed for 40 minutes under pressure in a cylinder dryer, thus achieving heat curing. The obtained composite sheet was transparent.

Example 3

Preparation of Prepreg Sheet

Following mixing of 780 parts of the aforementioned finely fibrous cellulose aqueous suspension B diluted to a concentration of 0.2% and 15.6 parts of the aforementioned reactive compound emulsion B, 15.6 parts of a cationic coagulant having a concentration of 0.2% (product name: Fixage 621, manufactured by Kurita Kogyo Kagaku Co., Ltd.) was added, and the mixture was stirred for one minute. The thus obtained mixed liquid was subjected to suction dewatering on a nonwoven fabric (product name: TechnoWiper, manufactured by Technos Co., Ltd.) that had undergone a hot calendering treatment at 180° C., thus obtaining a wet sheet.

The obtained wet sheet was dried for 40 minutes under pressure in a 70° C. cylinder dryer to obtain a prepreg sheet. The obtained prepreg sheet was peeled from the TechnoWiper, yielding a finely fibrous cellulose composite prepreg sheet having a basis weight of 49.8 $g/m^2$.
(Ultraviolet Light-Cured Composite Sheet)

The aforementioned prepreg sheet was sandwiched between glass slides, and the resin was cured by irradiation with ultraviolet light (20 $J/cm^2$) for 10 minutes. The obtained composite sheet was transparent.
(Laminated and Ultraviolet Light-Cured Composite Sheet)

Five of the aforementioned prepreg sheets were overlapped, and following pressing for 30 minutes under vacuum in a room temperature press, the laminate was sandwiched between glass slides, and the resin was cured by irradiation with ultraviolet light (20 $J/cm^2$) for 10 minutes. The obtained composite sheet was transparent.
(Laminated and Electron Beam-Cured Composite Sheet)

Ten of the aforementioned laminate sheets were overlapped, and following pressing for 30 minutes under vacuum in a room temperature press, the laminate was sandwiched between glass slides and cured by irradiation for approximately 3 seconds with an electron beam, using an Electrocurtain-type electron beam accelerator (manufactured by ESI, Inc.) at an accelerating voltage of 175 kV and with an absorbed dose of 40 kGy. The obtained composite sheet was transparent.

Comparative Example 1

The finely fibrous cellulose aqueous suspension A was diluted to 0.2%, and this diluted suspension A was then subjected to suction dewatering on a nonwoven fabric (product name: TechnoWiper, manufactured by Technos Co., Ltd.) that had undergone a hot calendering treatment at 180° C., thus obtaining a wet sheet. The wet sheet was coated uniformly by spraying with diethylene glycol dimethyl ether (DEGDME) (manufactured by Toho Chemical Industry Co., Ltd., product name: Hisolve MDM, molecular weight: 134, boiling point: 162° C., surface tension: 28 N/m) in an amount of 100 parts per 100 parts of the wet sheet. An atomizer type device was used for the spraying. The pressure was then reduced to form a wet sheet containing water and DEGDME. The solid fraction of the wet sheet was 10%. The ratio between the water and the DEGDME contained within the wet sheet was 50/50. The wet sheet was dried at 80° C. for 3 minutes using a cylinder roll to obtain a first dried sheet. The thus obtained first dried sheet was semi-transparent, and existed in a damp state. The first dried sheet was then dried at 130° C. for 3 minutes (second drying step) to obtain a porous finely fibrous cellulose sheet of 35 $g/m^2$. The obtained sheet was white and opaque, and the thickness was 50 µm.

The obtained porous finely fibrous cellulose sheet of 35 $g/m^2$ was impregnated in a reactive compound (NK Ester A-DOD-N, manufactured by Shin-Nakamura Chemical Co., Ltd., 1,10-decanediol diacrylate), the impregnated sheet was pulled up out of the reactive compound and sandwiched between glass slides, and the resin was cured by irradiation for 10 minutes with ultraviolet light (20 $J/cm^2$). The thus obtained composite sheet had a basis weight of 80 $g/m^2$, a thickness of 110 µm, and was transparent.

The tensile strength and the delamination of each of the sheets obtained using the methods described above were investigated. The tensile strength was measured using the method prescribed in JIS P 8113-1998. The delamination was investigated using the following method. That is, a tape (manufactured by 3M Company, #400, width: 25 mm) was stuck to the front and rear surfaces of the obtained sheet, a rectangular (50 mm×100 mm) iron weight (1 kg) having a smooth bottom surface was placed on the front surface of the sheet, after 30 minutes the sheet was turned over and the weight was placed on the rear surface of the sheet, and after a further 30 minutes the tapes were peeled from the sheet. If no peeling occurred between layers of the sheet, then the sheet was deemed to have undergone delamination. If no peeling occurred and the tape or the sheet ruptured, or if no rupture of the tape or sheet occurred and the tape was able to be peeled, then the sheet was deemed to have no delamination. The results are shown in Table 1.

TABLE 1

|  | Sheet type | Tensile strength MPa | Delamination |
|---|---|---|---|
| Example 1 | Heat-cured composite sheet | 105 | No |
|  | Laminated and heat-cured composite sheet 1 | 108 | No |
|  | Laminated and heat-cured composite sheet 2 | 102 | No |

TABLE 1-continued

| | Sheet type | Tensile strength MPa | Delamination |
|---|---|---|---|
| | Laminated and heat-cured composite sheet 3 | 105 | No |
| Example 2 | Heat-cured composite sheet | 105 | No |
| | Laminated and heat-cured composite sheet | 104 | No |
| Example 3 | Ultraviolet light-cured composite sheet | 102 | No |
| | Laminated and ultraviolet light-cured composite sheet | 109 | No |
| | Laminated and electron beam-cured composite sheet | 105 | No |
| Comparative Example 1 | Ultraviolet light-cured composite sheet | 85 | No |

INDUSTRIAL APPLICABILITY

According to the production methods of the present invention, a finely fibrous cellulose can be efficiently formed as a prepreg sheet or formed as a (laminate) composite sheet, and the thus obtained sheets exhibit excellent strength properties.

The invention claimed is:

1. A method of producing a finely fibrous cellulose composite prepreg sheet, the method comprising:
   mixing an emulsion of a reactive compound with an aqueous suspension containing a finely fibrous cellulose to prepare a mixed liquid, wherein the finely fibrous cellulose comprises fibers having a width of 2 nm to 1000 nm;
   dewatering the mixed liquid by filtration on a porous substrate to form a water-containing sheet; and
   heating and drying the water-containing sheet to form the prepreg sheet, wherein the reactive compound forms a curable matrix for the prepreg sheet.

2. The method of producing a finely fibrous cellulose composite prepreg sheet according to claim 1, wherein the emulsion of a reactive compound is cationic.

3. The method of producing a finely fibrous cellulose composite prepreg sheet according to claim 1, wherein a cellulose coagulant is added to the mixed liquid containing the finely fibrous cellulose.

4. The method of producing a finely fibrous cellulose composite prepreg sheet according claim 1, wherein the reactive compound is a heat-curable compound, a photocurable compound, or an electron beam-curable compound.

* * * * *